United States Patent [19]
Eldridge et al.

[11] Patent Number: 5,194,582
[45] Date of Patent: Mar. 16, 1993

[54] PROCESS TO DEODORIZE AN ODOROUS POLY(MONO-1-OLEFIN)

[75] Inventors: Robert B. Eldridge; Francis X. Mueller, Jr.; Ralph C. Farrar, Jr.; Kenneth W. Willcox; Kiplin D. Cowan; David R. Battiste, all of Bartlesville, Okla.

[73] Assignee: Phillips Petroleum Company, Bartlesville, Okla.

[21] Appl. No.: 933,140

[22] Filed: Aug. 21, 1992

[51] Int. Cl.$^5$ .............................................. C08F 6/00
[52] U.S. Cl. .................................. 528/480; 528/483; 528/490; 528/491; 528/494; 528/496; 528/498; 528/499
[58] Field of Search ............... 528/480, 483, 490, 491, 528/494, 496, 498, 499

[56] References Cited

U.S. PATENT DOCUMENTS

| | | | |
|---|---|---|---|
| 2,928,130 | 3/1960 | Gray | 521/79 |
| 3,406,230 | 10/1968 | Baxter et al. | 521/79 |
| 4,061,566 | 12/1977 | Modell | 210/32 |
| 4,695,621 | 9/1987 | Allada | 528/483 |
| 4,703,105 | 10/1987 | Allada | 528/483 |

FOREIGN PATENT DOCUMENTS

3931498A1 3/1990 Fed. Rep. of Germany.

OTHER PUBLICATIONS

Encyclopedia of Polymer Science & Engineering, vol. 16, pp. 368–399.
Encyclopedia of Chemical Technology, Third Edition, Supplement Volume, pp. 872–893.
Polymer News, 1985, vol. 11, pp. 7–16, "Processing of Polymers with Supercritical Fluids".
Reviews in Chemical Engineering, vol. 1, No. 2, pp. 179–250.

*Primary Examiner*—Morton Foelak
*Attorney, Agent, or Firm*—Carl D. Corvin

[57] ABSTRACT

A process is provided comprising contacting under deodorizing conditions, at least one deodorizing composition with at least one poly(mono-1-olefin), wherein said deodorizing conditions comprise, a standard pressure from about 1 to about 5, and a standard temperature from about 0.5 to about 2.5.

33 Claims, No Drawings

5,194,582

PROCESS TO DEODORIZE AN ODOROUS POLY(MONO-1-OLEFIN)

BACKGROUND OF THE INVENTION

This invention relates to a process to deodorize an odorous poly(mono-1-olefin).

Poly(mono-1-olefin)s have been used in a wide variety of applications. For example, poly(mono-1-olefin)s have been fabricated into molded articles such as pipes, films, fibers, and containers. However, one persistent problem that has limited the development of poly(mono-1-olefin) applications has been the generation of odorous compounds during the production of the poly(mono-1-olefin). These odorous compounds are then incorporated into the poly(mono-1-olefin) material. After incorporation, these odorous compounds interfere with the utilization of the poly(mono-1-olefin) material in applications where such odors would be undesirable. An example of this occurs when a poly(mono-1-olefin) material, such as polypropylene, is used to fabricate a container, for a liquid or a solid product that is meant for human consumption, and that poly(mono-1-olefin) container imparts a distasteful olfactory impact upon the consumer of the product.

Considering the subjectiveness of determining an odor's quality, it is best if there are not any odorous compounds in the poly(mono-1-olefin) material at all. However, it is hard, if not impossible sometimes, to determine exactly which compound, in a group of compounds, is odorous. Given the difficulties in determining which compounds are odorous, it is reasonable to eliminate as many suspected odorous compounds as possible from the poly(mono-1-olefin). However, current methods in the art to eliminate odors from poly(mono-1-olefin) materials have not kept pace with consumer demand. Furthermore, most solutions to this odor problem involve such materials and conditions as oxidizing agents and/or high pressure (>100 MPa) equipment. One reason for this lack of development has been due, in part, to the aliphatic, close-packed, molecular structure of these poly(mono-1-olefins). This invention provides an alternative method of odor elimination/reduction.

SUMMARY OF THE INVENTION

It is an object of this invention to provide a process to deodorize an odorous solid poly(mono-1-olefin).

It is another object of this invention to provide a process to lower the odor intensity score (as defined herein) of an odorous solid poly(mono-1-olefin).

It is still another object of this invention to provide a process to neutralize the odor quality score (as defined herein) of an odorous solid poly(mono-1-olefin).

It is still yet another object of this invention to provide a process to lower the odor impact (as defined herein) score of an odorous solid poly(mono-1-olefin).

In accordance with this invention, a process is provided comprising contacting under deodorizing conditions, at least one deodorizing composition with at least one poly(mono-1-olefin) that is in the solid state, wherein said deodorizing conditions comprise, a standard pressure (as defined herein) from about 1 to about 5 and a standard temperature (as defined herein) from about 0.5 to about 2.5.

In accordance with another embodiment of this invention a process is provided consisting essentially of contacting under deodorizing conditions, at least one deodorizing composition with at least one poly(mono-1-olefin), wherein said deodorizing conditions consist essentially of, a standard pressure from about 1 to about 5 and a standard temperature from about 0.5 to about 2.5.

In accordance with yet another embodiment of this invention a process is provided consisting of contacting under deodorizing conditions, at least one deodorizing composition with at least one poly(mono-1-olefin), wherein said deodorizing conditions consist of, a standard pressure from about 1 to about 5 and a standard temperature from about 0.5 to about 2.5.

The invention as disclosed herein may suitably be practiced in the absence of any steps, parameters, process conditions, or components not specifically disclosed herein.

One of the advantages of this invention is that the solid poly(mono-1-olefin) composition can remain in the solid state during this process thereby lowering production costs.

DETAILED DESCRIPTION OF THE INVENTION

Poly(mono-1-olefin)s

The term poly(mono-1-olefin) is defined for the purposes of this application to mean both poly(mono-1-olefins) and poly(mono-1-olefin). In the first case more than one type of mono-1-olefin can be present in the molecular structure. In the second case only one type of mono-1-olefin can be present in the molecular structure. By "type" the applicants mean the molecular arrangement and composition of the mono-1-olefin monomer. Generally, these terms are also referred to as copolymers and homopolymers, respectively.

In general, this invention is broadly applicable to any poly(mono-1-olefin). These poly(mono-1-olefin)s can have an atactic, syndiotactic, or isotactic molecular structure. Furthermore, such a poly(mono-1-olefin) can have a mixture of these types of molecular structures in its macrostructure.

If the poly(mono-1-olefin) is a copolymer it can have a random or regular molecular olefin structure. That is, a random copolymer would have at least two different mono-1-olefins arranged in a random order in the molecular chain. A regular copolymer could either have an alternating or block molecular olefin structure. An alternating molecular olefin structure would have at least two different mono-1-olefins arranged in a repeating order in the molecular chain. For example, if four mono-1-olefins A, B, C, and D were polymerized in an alternating molecular olefin structure a possible example would be ABCDABCD. A block molecular olefin structure would have at least two different mono-1-olefins arranged in a segmented repeating order in the molecular chain. For example, if four mono-1-olefins A, B, C, D were polymerized in a block molecular olefin structure a possible example would be AAABBBCCCDDD.

The molecular weight of these poly(mono-1-olefins) can be from about 1,000 to about 20,000,000 as determined by gel permeation chromatography. Preferably, the molecular weight is from about 5,000 to about 2,000,000 and most preferably from 10,000 to 1,000,000 due to ease of production, use, and economic factors. An example of a molecular weight determination method would be using a Waters 150C chromatograph operated at 140° C. with 1,2,4 trichlorobenzene as a carrier solvent for determining the molecular weight of a polyethylene material separated by size exclusion or gel permeation chromatographic columns, SEC or GPC respectively.

Examples of poly(mono-1-olefin)s which can be used in this invention include, but are not limited to, polyethylene, polypropylene, poly(1-butene), poly(3-methyl-1-butene), poly(1-pentene), poly(3-methyl-1-pentene), poly(4-methyl-1-pentene), poly(1-hexene), poly(3-ethyl-1-hexene), as well as, mixtures of two or more of said poly(mono-1-olefin)s.

The mono-1-olefins which can be polymerized into poly(mono-1-olefin)s can be characterized by the following formula:

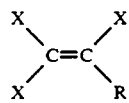

wherein each X is independently selected from the group consisting of hydrogen, fluorine, chlorine, bromine, and iodine; and wherein the R group is selected from the group consisting of hydrogen, fluorine, chlorine, bromine, iodine, and alkyl radicals; and wherein said alkyl radicals have either a linear or branched molecular structure; and wherein said alkyl radicals consist essentially of carbon and hydrogen; and wherein the number of carbon atoms in each alkyl radical is from 1 to about 32 inclusive, preferably from 1 to 20, and most preferably from 1 to 10. Examples of these mono-1-olefins are ethylene, vinyl chloride tetrafluoroethylene, propylene, 1-butene, 3-methyl-1-butene, 1-pentene, 3-methyl-1-pentene, 4-methyl-1-pentene, 1-hexene, 1-heptene, 1-octene, 1-nonene, 1-decene, dodecene, tetradecene, hexadecene, as well as, mixtures of two or more of said mono-1-olefins. These mono-1-olefins can be polymerized either alone or in combination with one or more of the others. Furthermore, they can be polymerized with any of the known catalyst systems or polymerization techniques.

Prior to deodorizing the odorous poly(mono-1-olefin), it can be contacted with a metal complexing compound to further enhance the use of this process. For example, any low molecular weight (less than 1,000) alcohol, dialcohol, ketone, or diketone could be used to complex residual metals in the poly(mono-1-olefin). Thereafter, during the deodorizing process a substantial portion of these metals could be removed. Examples of metal complexing compounds include, but are not limited to, methanol, ethanol, propanol, 1,3-propanediol, 1,4-butanedione, acetylacetone, as well as mixtures of two or more of said metal complexing agents.

DEODORIZING COMPOSITIONS

The deodorizing composition can be any compound in which the poly(mono-1-olefin) is insoluble at the process conditions described below. Additionally, the deodorizing composition should be able to show supercritical behavior at some temperature and pressure. That is, when the composition is compressed and heated to conditions above its critical point, the substance becomes a supercritical fluid. That is, as the critical point is approached, its isothermal compressibility tends to infinity and its density changes dramatically. Examples of deodorizing substances are ammonia, boron trifluoride, carbon dioxide, krypton, phosphine, chlorotrifluorosilane, silane, silicon tetrafluoride, xenon, monochlorodifluoromethane, trifluoromethane, monofluoromethane, dichlorodifluoromethane, monobromotrifluoromethane, monochlorotrifluoromethane, tetrafluoromethane, acetylene, ethylene, 1,1-difluoroethylene, ethane, dimethylether, propadiene, methylacetylene, propylene, propane, isobutane, perfluorobutane, methanol, ethanol, propanol, water, as well as, mixtures of two or more of said deodorizing compositions. The most preferred deodorizing substance is carbon dioxide due to ease of use and availability. Additionally, mixtures of different deodorizing substances could be used in this process at the same time.

PROCESS CONDITIONS

The most important factors to consider in performing the invention are the pressure and the temperature of the deodorizing composition upon its initial contact with the poly(mono-1-olefin).

In general, the pressure used, is from a standard pressure of about 1 to about 5.0. The standard pressure is defined as the pressure used during the invention divided by the critical pressure for that substance. Since the pressure units are equal they cancel out. The standard pressure is also known in the art as the reduced pressure. The critical pressures of deodorizing compositions can be readily determined by persons skilled in the art. Values of critical pressures for several compositions have been tabulated. For example, the 56th Edition of the Handbood of Chemistry and Physics on p. F-85 through F-86 discloses several compositions and their critical pressure. Preferably the pressure is from about a standard pressure of about 1 to about 4.0. However, most preferably the pressure is from a standard pressure of 1 to a standard pressure of 3, inclusive. An example is the use of carbon dioxide, which has a critical pressure of 1071 psia or 7.38 megapascals. In general, the pressure at which the carbon dioxide is employed is in the range of about 7.38 megapascals to about 37 megapascals. Preferably, the pressure is in the range of about 7.38 megapascals to about 30 megapascals and more preferably from 7.38 megapascals to 22 megapascals inclusive. However, for carbon dioxide the most preferred range is 8 to 16 megapascals inclusive due to ease of use and processing conditions.

In general, the temperature used is from a standard temperature of about 0.5 to a standard temperature of 2.5. The standard temperature is defined as the temperature, in Kelvins, used during the process divided by the critical temperature, in Kelvins, of the deodorizing substance. The standard temperature is also known in the art as the reduced temperature. The critical temperatures of deodorizing compositions can be readily determined by persons in the art. Values of critical temperatures for several compositions have been tabulated. For example, the 56th Edition of the Handbook of Chemistry and Physics on p. F-85 through F-86 discloses several compositions and their critical temperatures. However, the important criteria for this process variable is that the poly(mono-1-olefin) should not melt at the temperature employed, in other words the poly(mono-1-olefin) must remain substantially solid during this process. However, it is preferably that the temperature used is from a standard temperature of about 0.75 to about 1.5, and most preferably the temperature is from a standard temperature of 0.90 to a standard temperature of 1.10. An example is the use of carbon dioxide which has a critical temperature of 304 Kelvins. In general, the temperature at which carbon dioxide is employed, is from about 150 Kelvins to about 760 Kelvins, preferably about 230 Kelvins to about 460 Kelvins, and most preferably 275 Kelvins to 335 Kelvins.

Other factors to consider are the flow rate and the deodorization time. The flow rate of the deodorizing composition pass and/or through the poly(mono-1-olefin) is from about 1 m$^3$/s (cubic meters per second) to about 1,000 m$^3$/s. Preferably from about 2 m$^3$/s to about 100 m$^3$/s and most preferably from about 4 m$^3$/s to 50 m$^3$/s inclusive. The deodorizing time, or the amount of time the poly(mono-1-olefin) is subjected to the above conditions, is from about 1 minute to about 10 hours. Preferably about 5 minutes to about 5 hours and most preferably from about 10 minutes to about 120 minutes.

EXAMPLE

This example is provided to further assist a person skilled in the art with understanding this invention. This example is intended to be generally illustrative of this invention and is not intended to be construed as unduly limiting the reasonable scope of this invention.

The polyproylene used in this example was produced using a titanium chloride catalyst system. These types of catalyst systems are generally known in the art. The polymerization scheme to produce this polymer using this type of catalyst system is also generally known in the art. This polymer can be described as a propylene-ethylene random copolymer which has both an atactic and an isotatic molecular structure. The density of this polymer was about 0.90 grams per cubic centimeter as measured by ASTM-D-1505. The melt flow of this polymer was about 1.8 grams per 10 minutes as measured by ASTM-D-1238 at 230/2.16 Condition L.

The apparatus used in this example was essentially composed of a carbon dioxide reservoir, (hereafter, "reservoir"), a flash tank, (hereafter, "tank") a gas flow meter, (hereafter, "meter"), and an odor extraction vessel, (hereafter, "vessel"). The reservoir contained essentially pure liquid carbon dioxide. This reservoir was connected via tubing with the vessel. The vessel was a 2 inch, schedule 80 pipe vessel, with a 0.0205 square foot cross-section. It was equipped with a pressure gauge and a temperature gauge. The temperature of the vessel was controlled by a furnace which surrounded the vessel. The vessel was connected via tubing to the tank. The tank was used to collect liquid which might come from the carbon dioxide stream. The tank was connected via tubing to the meter. The meter was used to collect the carbon dioxide stream's temperature, pressure and flow rate.

The procedure used to perform the odor extraction follows. The vessel was loaded with an amount of polypropylene. The vessel was then sealed and pressure tested for leaks. High pressure, liquid carbon dioxide from the reservoir was then fed into the vessel. The extraction pressure was maintained by the use of a back pressure control valve. The temperature was controlled by the furnace. The carbon dioxide stream which exited the vessel then entered the tank which was generally maintained at a pressure of about 600 pounds per square inch. Although there was a liquid collection section in the tank, essentially no substantial portions of liquid were recovered. After running the extraction for about one hour, the vessel was allowed to cool to room temperature. The vessel was then depressurized and the polymer was removed from the vessel.

The extracted polymer was then odor tested using procedures similar to those found in the ASTM Special Technical Publication 434 entitled "Manual on Sensory Testing Methods" In general, 25 grams of each of the extracted polymers were sealed individually in a glass jar. These jars were then heated to a temperature of 90° C. This temperature was then maintained for 30 minutes and then the jars were allowed to cool to room temperature.

The odor panel then evaluated each polymer for both its odor intensity and its odor quality. The odor intensity is a measure of how strong an odor was perceived by the odor panelists while they ignored the odor quality. The odor intensity was measured on a scale of 0 to 9 where a 0 meant that the sample had essentially no odor intensity and 9 meant that the sample had a very strong odor intensity. Furthermore, the odor panel was informed that the scale was arithmetic. That is, an odor intensity of 6 would be 6 times stronger than an odor intensity of 1, and an odor intensity of 4 would be twice as strong as an odor intensity of 2. The odor quality is a measure of how pleasant or how revolting an odor was perceived by the odor panelists while they ignore the odor intensity. The odor quality is also known in the art as the hedonic tone. The odor quality was measured on a scale of −5 to +5 where −5 meant that the sample had a revolting odor and +5 meant that the sample had a pleasant odor and 0 meant that the sample had a neutral odor. Overall a sample with the lowest odor intensity value and an odor quality value closest to zero is the most preferred for commercial reasons.

The results of this experimentation are presented below in Table I.

TABLE I

| Run Number | Column Identification Number | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| 11 | 398.4 | 2205 | 15.30 | 2.07 | 113 | 318 | 1.05 | 0.10 | 4.72 | 122 | 323 | 0.4 | 0.104 | 4 | −1 | 17 |
| 12 | 423.8 | 2205 | 15.30 | 2.07 | 75 | 297 | 0.98 | 0.10 | 4.72 | 85 | 303 | 0.7 | 0.106 | 4 | −1 | 17 |
| 13 | 422.1 | 1700 | 11.82 | 1.60 | 94 | 308 | 1.01 | 0.10 | 4.72 | 126 | 325 | 0.8 | 0.107 | 3 | 0 | 9 |
| 14 | 419.3 | 1190 | 8.31 | 1.13 | 113 | 318 | 1.05 | 0.10 | 4.72 | 132 | 329 | 0.2 | 0.103 | 3 | 0 | 9 |
| 15 | 404.2 | 1190 | 8.31 | 1.13 | 75 | 297 | 0.98 | 0.10 | 4.72 | 119 | 321 | 0.5 | 0.103 | 3 | 0 | 9 |
| 16 | 423.9 | 2205 | 15.30 | 2.07 | 94 | 308 | 1.01 | 0.60 | 28.32 | 107 | 315 | 0.5 | 0.105 | 2 | −1 | 5 |
| 17 | 418.0 | 1700 | 11.82 | 1.60 | 94 | 308 | 1.01 | 0.60 | 28.32 | 102 | 312 | 1.0 | 0.108 | 2 | 0 | 4 |
| 18 | 434.2 | 1700 | 11.82 | 1.60 | 94 | 308 | 1.01 | 0.60 | 28.32 | 104 | 313 | 0.6 | 0.106 | 1 | 1 | 2 |
| 19 | 426.3 | 1700 | 11.82 | 1.60 | 94 | 308 | 1.01 | 0.60 | 28.32 | 148 | 338 | 0.3 | 0.103 | 2 | 0 | 4 |
| 20 | 421.2 | 1700 | 11.82 | 1.60 | 75 | 297 | 0.98 | 0.60 | 28.32 | 111 | 317 | 0.7 | 0.106 | 3 | −1 | 10 |
| 21 | 426.0 | 1190 | 8.31 | 1.13 | 94 | 308 | 1.01 | 0.60 | 28.32 | 143 | 335 | 0.5 | 0.105 | 2 | 0 | 4 |
| 22 | 414.4 | 2205 | 15.30 | 2.07 | 113 | 318 | 1.05 | 1.00 | 47.20 | 112 | 318 | 0.7 | 0.106 | 3 | 0 | 9 |
| 23 | 434.8 | 2205 | 15.30 | 2.07 | 75 | 297 | 0.98 | 1.00 | 47.20 | 130 | 328 | 1.0 | 0.108 | 1 | 0 | 1 |
| 24 | 417.0 | 1700 | 11.82 | 1.60 | 94 | 308 | 1.01 | 1.00 | 47.20 | 121 | 323 | 1.0 | 0.108 | 2 | −1 | 5 |
| 25 | 422.9 | 1190 | 8.31 | 1.13 | 113 | 318 | 1.05 | 1.00 | 47.20 | 81 | 300 | 1.0 | 0.108 | 3 | −1 | 10 |

TABLE I-continued

| Run Number | Column Identification Number | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| 26 | 421.4 | 1190 | 8.31 | 1.13 | 75 | 297 | 0.98 | 1.00 | 47.20 | 92 | 306 | 0.5 | 0.108 | 2 | 1 | 5 |

Column Identification
1. This is the mass of the polymer in grams.
2. This is the pressure measured at the odor extraction vessel in psig.
3. This is the approximate pressure at the odor extraction vessel in megapascals. Atmospheric pressure was assumed to be 0.10 megapascals.
4. This is the standard pressure. The standard pressure is equal to the pressure in the odor extraction vessel (psig + 14.696 psi) divided by the critical pressure of carbon dioxide which is 1071 psi.
5. This is the temperature measured at the odor extraction vessel in degrees Fahrenheit.
6. This is the approximate temperature in the odor extraction vessel in Kelvins.
7. This is the standard temperature. The standard temperature is equal to the temperature in the odor extraction vessel divided by the critical temperature of carbon dioxide which is 304 K. It is important to use Kelvins in calculating the standard temperature.
8. This is the gas flow rate of the carbon dioxide through the odor extraction vessel as measured at the gas flow meter in cubic feet per minute.
9. This is the approximate gas flow rate of the carbon dioxide through the odor extraction vessel in cubic meters per second $\times 10^5$.
10. This is the temperature of the carbon dioxide measured at the gas flow meter in degrees Fahrenheit.
11. This is the approximate temperature of the carbon dioxide at the gas flow meter in Kelvins.
12. This is the pressure of the carbon dioxide measured at the gas flow meter in psig.
13. This is the approximate pressure of the carbon dioxide at the gas flow meter in megapascals. Atmospheric pressure was assumed to be 0.10 megapascals.
14. This is the odor intensity score (OIS).
15. This is the odor quality score (OQS).
16. This is the odor impact score. It is equal to $OIS^2 + OQS^2$. It represents the relative impact of the odor, on an average person.

For comparison purposes two samples of unextracted polymer were also evaluated by the odor panel using the same techniques as above. Both of these samples had an odor intensity of 5 which was the highest odor intensity. The average odor quality of the samples was $-1.5$, ($-2$, $-1$, respectively). This represents one of the most disagreeable odors observed. The odor impact score of these polymers was 29 and 26, respectively. Overall, these two samples had an intense, disagreeable odor which would be highly objectional if used in a human consumer product mode.

However, as can be seen from Runs 11-26 subjecting this polymer to carbon dioxide at these pressures and temperatures greatly improved the odor intensity, (range=1 to 4 point decrease, average=2.5 point decrease), while slightly improving the odor quality, (range=0.5 to 2.5 point decrease, average=1.25 point decrease). Furthermore, the odor impact scores were reduced from the high twenties to almost zero. Therefore, it can be concluded that at these relatively low pressures and low temperatures polypropylene can be deodorized.

It is also interesting to note Runs 11-15. It seems that at low gas flow rates the deodorization effect seems to be independent of the temperature. This is apparent from comparing Runs 11 to 12 and Runs 14 to 15. In each case the pressure remained the same and the temperature changed, yet no odor change was observed. However, comparing Runs 11 to 14 and 12 to 15 it is apparent that while the temperature stayed the same and the pressure decreased, the odor intensity and odor quality of the polymer improved.

That which is claimed is:

1. A process to deodorize an odorous solid poly(-mono-1-olefin) said process comprising:
   contacting, under deodorizing conditions, at least one deodorizing composition with at least one poly(-mono-1-olefin); wherein said deodorizing conditions comprise
   a standard pressure from about 1 to about 5 and
   a standard temperature from about 0.5 to about 2.5;
   wherein said poly(mono-1-olefin) is substantially in the solid state.

2. A process according to claim 1 wherein said poly(-mono-1-olefin) is selected from the group consisting of homopolymers, copolymers, or a mixture of at least one homopolymer and at least one copolymer.

3. A process according to claim 2 wherein said poly(-mono-1-olefin) consists of a copolymer.

4. A process according to claim 3 wherein said copolymer consists of propylene and at least one other mono-1-olefin.

5. A process according to claim 4 wherein said mono-1-olefin consists of ethylene.

6. A process according to claim 1 wherein said poly(-mono-1-olefin) has an molecular structure selected from the group consisting of an atactic molecular structure, a syndiotactic molecular structure, an isotactic molecular structure or a mixture of two or more of said molecular structures.

7. A process according to claim 2 wherein said copolymer and said homopolymer have an molecular structure selected from the group consisting of an atactic molecular structure, a syndiotactic molecular structure, an isotactic molecular structure, or a mixture of two or more of said molecular structures.

8. A process according to claim 7 wherein said copolymer has a molecular structure consisting of a mixture of an atactic molecular structure and an isotactic molecular structure.

9. A process according to claim 8 wherein said copolymer consists of propylene and at least one other mono-1-olefin.

10. A process according to claim 9 wherein said mono-1-olefin consists of ethylene.

11. A process according to claim 7 wherein said homopolymer has a molecular structure consisting of a mixture of an atactic molecular structure and an isotactic molecular structure.

12. A process according to claim 1 wherein said mono-1-olefin in said poly(mono-1-olefin) has the following molecular structure

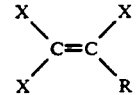

wherein each X is independently selected from the group consisting of hydrogen, fluorine, chlorine, bromine, and iodine, and wherein each R is selected from the group consisting of hydrogen, fluorine, chlorine, bromine, iodine, linear alkyl radicals that have from one to about thirty-two carbon atoms inclusive in their molecular structure, and branched alkyl radicals that have one to thirty-two carbon atoms inclusive in their molecular structure.

13. A process according to claim 7 wherein the mono-1-olefins in said copolymer and said homopolymer have the following molecular structure

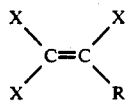

wherein each X is independently selected from the group consisting of hydrogen, fluorine, chlorine, bromine, and iodine, and wherein each R is selected from the group consisting of hydrogen, fluorine, chlorine, bromine, iodine, linear alkyl radicals that have from one to about thirty-two carbon atoms inclusive in their molecular structure, and branched alkyl radicals that have one to thirty-two carbon atoms inclusive in their molecular structure.

14. A process according to claim 13 wherein said mono-1-olefin is selected from the group consisting of ethylene, vinyl chloride, tetrafluoroethylene, propylene, 1-butene, 3-methyl-1-butene, 1-pentene, 3-methyl-1-pentene, 4-methyl-1-pentene, 1-hexene, 3-ethyl-1-hexene, 1-heptene, 1-octene, 1-nonene, 1-decene, dodecene, tetradecene, hexadecene, and mixtures of two or more of said mono-1-olefins.

15. A process according to claim 14 wherein said mono-1-olefin consists of a mixture of said propylene and at least one other mono-1-olefin.

16. A process according to claim 15 wherein said other mono-1-olefin is ethylene.

17. A process according to claim 1 wherein said deodorizing composition is selected from the group consisting of ammonia, boron trifluoride, carbon dioxide, krypton, phosphine, chlorotrifluorosilane, silane, silicon tetrafluoride, xenon, monochlorodifluoromethane, trifluoromethane, monofluoromethane, monobromotrifluoromethane, monochlorotrifluoromethane, dichlorodifluoromethane, tetrafluoromethane, acetylene, ethylene, 1,1-difluoroethylene, ethane, dimethylether, propadiene, methyl acetylene, propylene, propane, isobutane, perfluorobutane, methanol, ethanol, propanol, water, or mixtures of two or more of said deodorizing compositions.

18. A process according to claim 13 wherein said deodorizing composition is selected from the group consisting of ammonia, boron trifluoride, carbon dioxide, krypton, phosphine, chlorotrifluorosilane, silane, silicon tetrafluoride, xenon, monochlorodifluoromethane, trifluoromethane, monofluoromethane, monobromotrifluoromethane, monochlorotrifluoromethane, dichlorodifluoromethane, tetrafluoromethane, acetylene, ethylene, 1,1-difluoroethylene, ethane, dimethylether, propadiene, methyl acetylene, propylene, propane, isobutane, perfluorobutane, methanol, ethanol, propanol, water, or mixtures of two or more of said deodorizing compositions.

19. A process according to claim 1 wherein said standard temperature is in the range of about 1 to about 4.

20. A process according to claim 18 wherein said standard temperature is in the range of about 1 to about 4.

21. A process according to claim 1 wherein said standard temperature is in the range of about 0.75 to about 1.5.

22. A process according to claim 18 wherein said standard temperature is in the range of about 0.75 to about 1.5.

23. A process according to claim 1 wherein said standard pressure is in the range of about 1 to about 4, said standard temperature is in the range of about 0.75 to about 1.5.

24. A process according to claim 18 wherein said standard pressure is in the range of about 1 to about 4, said standard temperature is in the range of about 0.75 to about 1.5.

25. A process according to claim 1 wherein said standard pressure is in the range of 1 to 3 inclusive, said standard temperature is in the range of 0.90 to 1.10 inclusive.

26. A process according to claim 18 wherein said standard pressure is in the range of 1 to 3 inclusive, said standard temperature is in the range of 0.90 to 1.10 inclusive.

27. A process according to claim 1 wherein said deodorizing composition comprises carbon dioxide.

28. A process according to claim 18 wherein said deodorizing composition consists of a mixture of carbon dioxide and at least one other deodorizing composition.

29. A process according to claim 18 wherein said deodorizing composition consists of carbon dioxide.

30. A process according to claim 1 wherein said poly(mono-1-olefin) is contacted with a metal complexing agent prior to said contacting with the deodorizing composition.

31. A process according to claim 30 wherein said metal complexing agent is selected from the group consisting of methanol, ethanol, propanol, 1,3-propanediol, 1,4-butanedione, acetylacetone, and mixtures of two or more of said metal complexing agents.

32. A process to deodorize an odorous, solid poly(mono-1-olefin) said process comprising contacting, under deodorizing conditions, carbon dioxide with said poly(mono-1-olefin), wherein said deodorizing conditions comprise a standard pressure from 1 to about 3 inclusive, and a standard temperature from 0.9 to 1.10 inclusive, and wherein said mono-1-olefin in said poly(mono-1-olefin) comprises propylene.

33. A process according to claim 32 wherein said pressure is from 8 to 16 megapascals and said temperature is 275 Kelvins to 335 Kelvins.

* * * * *